Feb. 18, 1930.   H. STRODTHOFF   1,747,607
LOADER
Filed March 25, 1927   4 Sheets-Sheet 3

Inventor
H. Strodthoff.

By Clarence A. O'Brien
Attorney

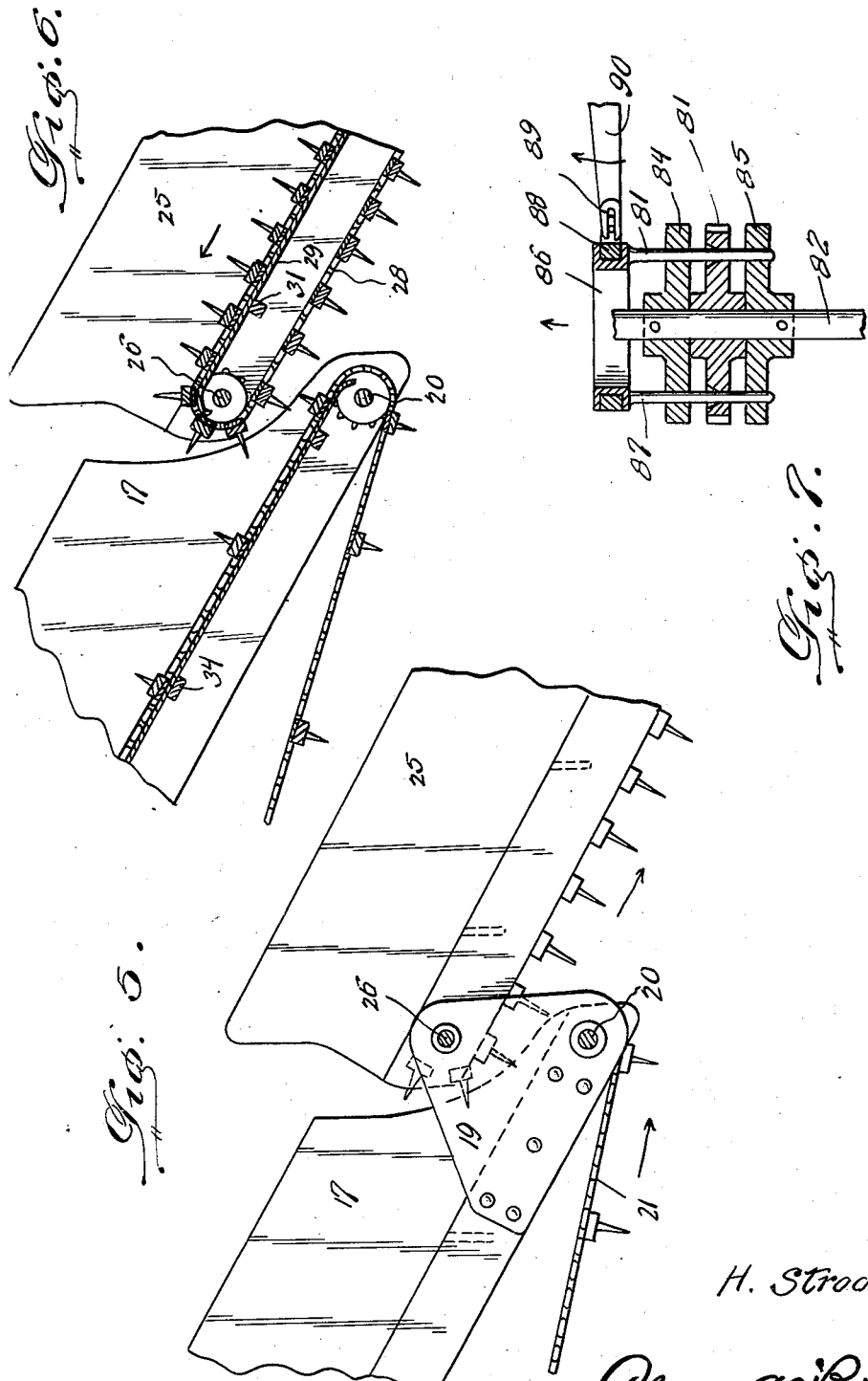

Patented Feb. 18, 1930

1,747,607

UNITED STATES PATENT OFFICE

HERRMANN STRODTHOFF, OF PANORA, IOWA

LOADER

Application filed March 25, 1927. Serial No. 178,357.

The present invention relates to an apparatus for gathering hay and clover, or alfalfa to be thrashed for seed, or sheaves or bundles of grain in the field and transferring them to a wagon or other vehicle which is alongside of the loader.

An important object of the invention is to provide an apparatus of this nature which will load hay or any other crop whether loose or in bundles, onto the wagon or other vehicle without breaking the leaves or stems or without thrashing any of the grain or seed, especially alfalfa or clover to be thrashed for seed.

Another very important object of this invention resides in the provision of a primary elevator which may be easily and readily shifted manually and which shifts automatically to suit the different rises and depressions of the ground so that said elevator just clears the ground as the driver has it set to clear the ground by regulating the skids.

Another very important object of the invention lies in the provision of an apparatus of this nature which will not damage the clover, alfalfa and the like that is raised for seed.

A still further important object of the invention lies in the provision of an apparatus of this nature which is comparatively simple in its conception, strong and durable, fairly efficient and reliable in operation, not likely to easily become out of order, and otherwise well adapted to the purpose for which it is designed.

With the above and numerous other objects in view, as will appear as the description proceeds, the invention resides in certain novel features of construction, and in the combination and arrangement of parts as will be hereinafter more fully described and claimed.

It is evident that many forms of mechanism may be provided for carrying out the objects of this invention, and I have shown one means for accomplishing each of the steps forming a part of my invention. The mechanism shown for carrying out this operation, however, is merely shown for the purposes of illustration, and the particular forms of mechanism is not particularly essential since the means for operating each step in the proper sequence is subordinate of the general operation and construction whereby an efficient loader of the character indicated is produced which reliably operates in the performance of the functions required by reason of the interrelation and coaction of the various mechanisms, thereby accomplishing the objects intended.

In the drawings:

Figure 3 is a vertical transverse section therethrough taken substantially on the line 3—3 of Figure 2;

Figure 4 is a fragmentary longitudinal sectional view showing the upper end of the secondary transverse conveyor taken substantially on the line 4—4 of Figure 1;

Figure 5 is an enlarged fragmentary elevation showing the connection between the primary and secondary longitudinal conveyors;

Figure 6 is a longitudinal vertical section therethrough;

Figure 7 is an enlarged detail sectional view of one of the clutches;

Figure 8 is a detailed sectional elevation of one of the cross bars;

Figure 9 is an enlarged detail section taken substantially on the line 9—9 of Figure 2.

Figure 1:
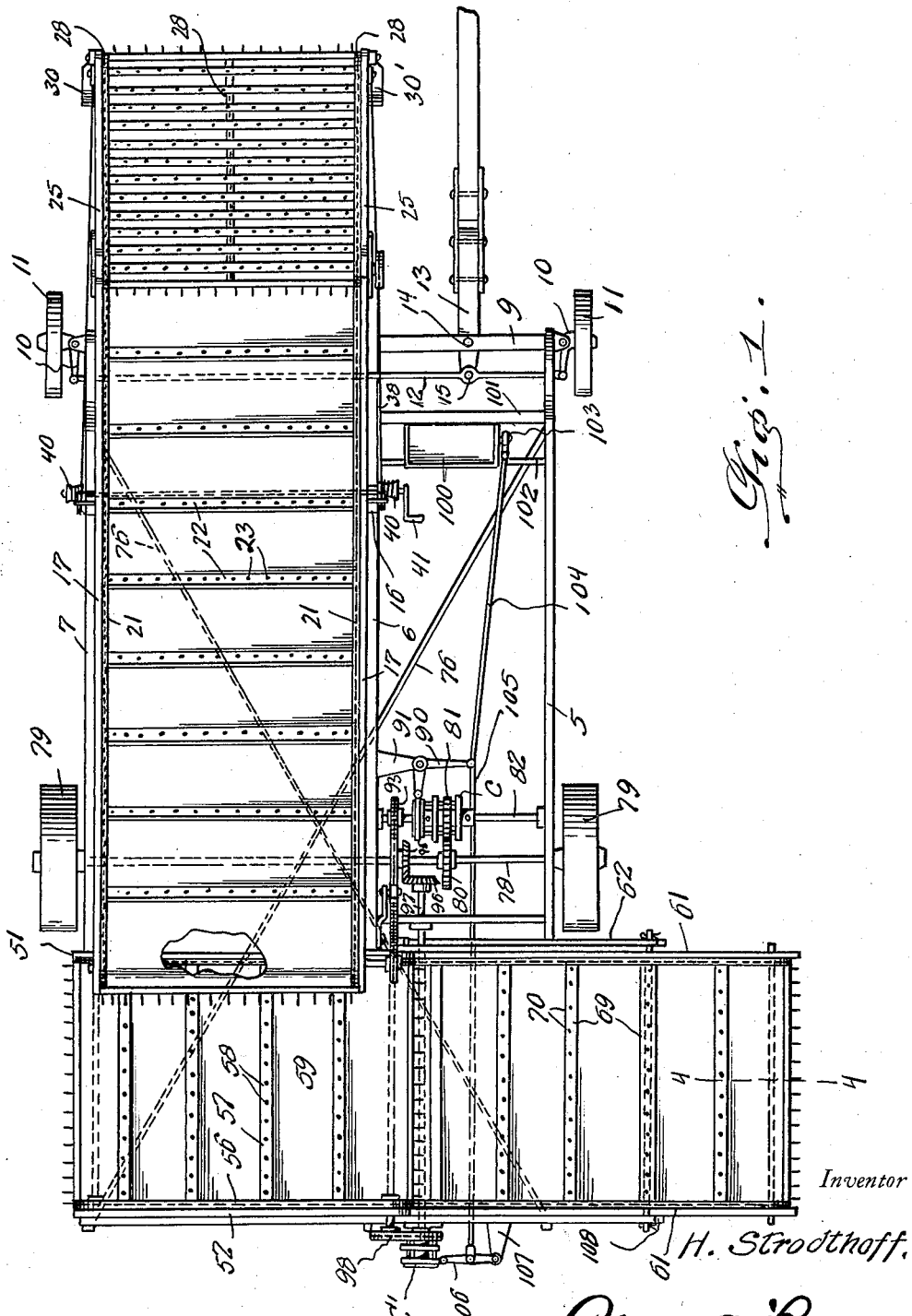
Figure 1 is a top plan view of the apparatus embodying the features of my invention.
Figure 2:
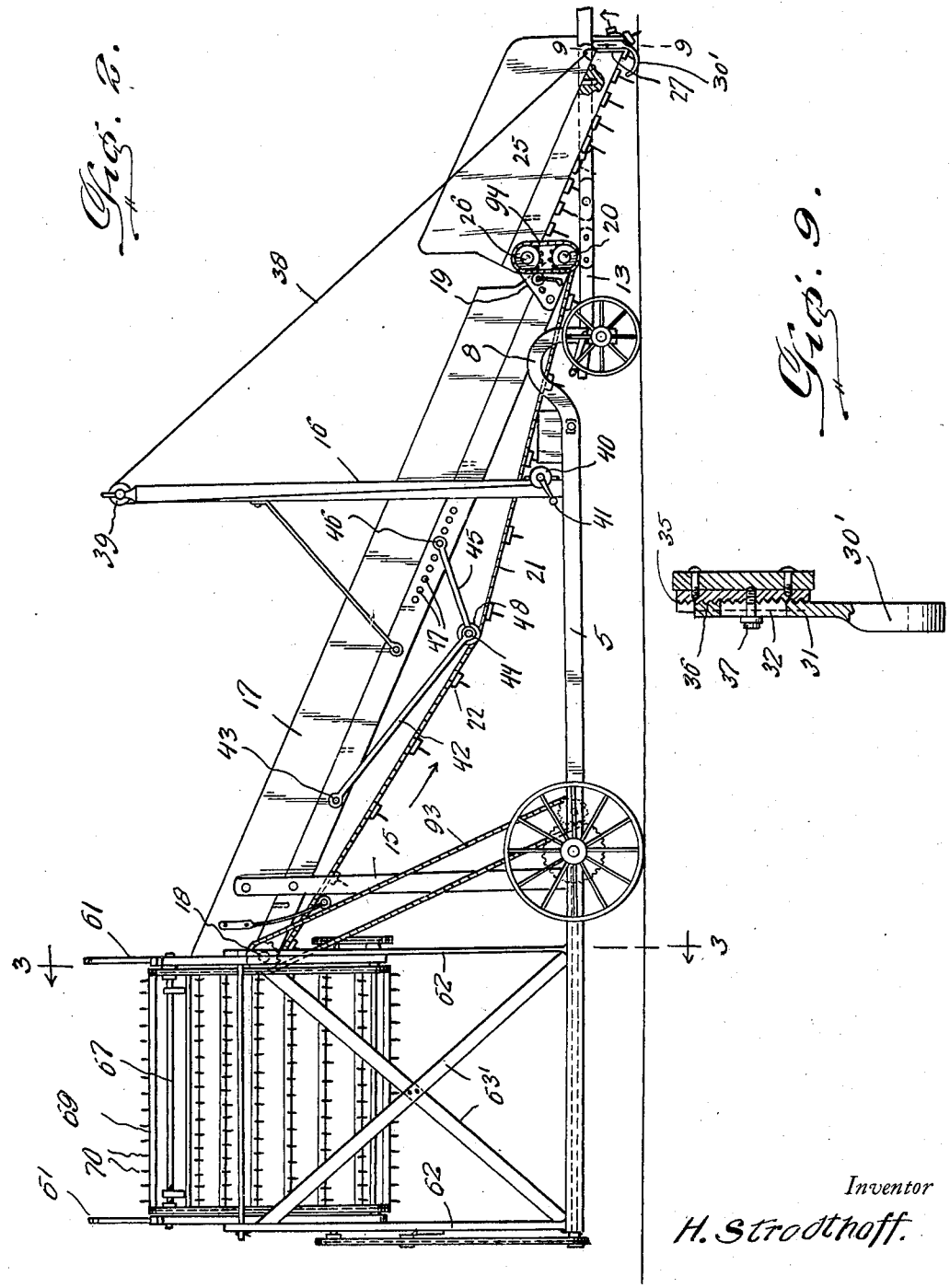
Figure 2 is a side elevation thereof.

Referring to the drawings in detail, it will be seen that the wheeled supporting structure of this apparatus includes a longitudinal frame, and a rear transverse frame. The longitudinal frame is made up of three longitudinal beams 5, 6 and 7, the forward ends of which are curved upwardly and then downwardly as is indicated at 8, and are connected to a front axle 9 on which is swingably mounted at the ends steering knuckles 10 with front wheels 11 journaled thereon. Any suitable draft and steering means may be used and the wheeled supporting structure may be self-propelled if desired. However, by way of example merely, I have disclosed the knuckles 10 as connected by a rod 12, and have illustrated a tongue 13 pivoted to the axle as at 14 adjacent one end and loosely pivoted as at 15' to the connecting rod 12.

Standards 15 rise from the rear ends of beams 6 and 7 and standards 16 rise therefrom adjacent the forward end thereof. The standards 16 are taller than the standards 15. Elongated side plates 17 are fixed to the standards 15 and 16 to be disposed in spaced parallelism and to incline downwardly and forwardly. A shaft 18 is journaled in the upper ends of the plates 17. Brackets 19 are mounted at the lower ends of the plates 17 and are of a triangular formation and in the lower forward corners thereof have journaled therein a shaft 20. Chains 21 are trained over sprockets mounted on shafts 18 and 20, and these chains are connected by cross bars 22 which have headed spikes 23 projecting therefrom, the same being mounted as is clearly indicated in Figure 8. The upper runs of these chains 21 are guided over cross members 34 mounted between the side plates 17. These chains 21 and cross bars 22 form the secondary longitudinal endless conveyor. The primary endless longitudinal conveyor is mounted forwardly of said secondary conveyor and is formed of side plates 25 which are swingably connected to brackets 19 by a shaft 26 journaled in the plates 25 and in the brackets 19. A shaft 27 is journaled in the lower ends of the plates 25. Chains 28 are journaled over brackets on shafts 26 and 27 and the upper runs of these chains travel over a plate 29 carried by cross members 30 disposed between plates 25. The lower end of the primary endless longitudinal conveyor is supported on skids 30' having shanks 31 formed with slots 32. Plates 35 are mounted on the forward end of the primary endless conveyor structure and have teeth engageable with similar teeth 36 on shanks 31. Bolts 37 engage in plates 35 and project through slots 32, whereby it may be seen that the skids 30' may be adjusted to raise or lower the forward end of the primary endless longitudinal conveyor as desired. Cables 38 are attached to the forward end of the primary longitudinal endless conveyor and are trained over sheaves 39 at the upper ends of the standards 16 and then extend down to wind on winches 40 mounted at the lower ends of the standards 16 and operable through a crank 41, or in any other suitable manner. Arms 42 are pivoted to side plates 17 as at 43 and at their other ends are pivoted as at 44 to arms 45 which have pins 46 projectable into openings 47 arranged in series so as to provide an adjustment by placing the pins 46 in a desired opening 47 it will be seen that the arms 42 and 45 may be swung to varying angles therebetween. Pulleys 48 are journaled on the pivot 44 and engage the lower runs of the chain 21. Therefore, the arms 42 and 45 and the pulleys 48 function as chain tighteners and will be quite apparent.

The primary transverse endless conveyor is mounted on standards 49 at the rear of beams 6 and 7 and braced by diagonal braces 50. This transverse endless conveyor includes a front member 51 and a rear plate member 52 which are disposed in spaced parallelism and have journaled therein shafts 53 and 54 on sprockets of which are trained chains 56 connected by cross bars 57 having spikes 58 projecting therefrom in a similar manner to bars 22 heretofore described. It is well to note at this time that the secondary longitudinal endless conveyor extends a distance over the front edge of the primary transverse endless conveyor so as to pile the material on the center of the latter. A plate 59 is disposed under the upper runs of the chains 56 and of course, the cross bars 57 slide thereover. The lower runs of the chains 56 have chain tighteners 60 associated therewith which are similar in construction to chain tighteners 42, 45 and 48. The secondary transverse endless conveyor comprises side plates 61 which incline upwardly and to the right of the machine and are supported on standards 62 rising from the rear of beam 5 embraced as at 63 and also on plates or brackets 64 depending from the right hand end of the primary transverse endless conveyor. A shaft 65 is journaled in the lower corners of the plates 61. The upper lower corners thereof are slotted longitudinally as at 66 and have journaled therein a shaft 67. Chains 68 are trained over sprockets on shafts 65 and 67 and are connected by cross bars 69 having spikes 70 in a similar manner to cross bars 22 heretofore referred to. A cross member 71 is disposed between the plates 61 and has extended therethrough threaded shanks 72, the upper ends of which have eyes receiving the shaft 67. Nuts 73 are engaged on the threaded shanks 72 and may be turned to tighten the chains 68 as will be quite apparent. A plate 74 is disposed between the side plates 61 under the upper runs of the chains 68. The standards 62 are further braced as is indicated at 63'. The main longitudinal frame is braced by diagonal braces 76, the arrangement of which is shown clearly in Fig. 1.

It is thought that the general arrangement of the four conveyors will be clearly understood without a more detailed description and attention is directed to the driving and control mechanism. An axle shaft 78 is journaled across the longitudinal frame structure immediately in front of the transverse frame structure as clearly indicated in Figure 1 and has mounted on the ends thereof rear wheels 79 which travel with the shaft 78 or vice versa. A spur gear 80 is fixed to this axle shaft 78 and is in constant mesh with a spur gear 81 on a shaft 82 mounted in the longitudinal frame transversely thereof. With this shaft 82 there is associated a clutch mechanism indicated generally by the letter C for turning the shaft 82 from the spur gear 81. This clutch mechanism C is disclosed in detail in Figure 7 and comprises a pair of disks 84 and 85 one on each side of the gear 81 and fixed to the shaft 82. An externally grooved annulus 86 has projecting therefrom pins 87 slidable through openings in disks 84, gear 81, and disk 85 in the order mentioned. A ring 88 is disposed in the groove of the annulus 86 and has a pin and slot connection 89 with a bell-crank lever 90 pivoted on a bracket 91 projecting laterally from the beam 6, a chain and sprocket connection 93 is provided between shaft 82 and shaft 18. A chain and sprocket connection 94 is provided between shafts 20 and 26. A bevelled pinion 95 is mounted on the shaft 78 and is in constant mesh with a bevelled pinion 96 on a shaft 97 journaled longitudinally of the supporting apparatus in the transverse frame structure which has a clutch C' on the rear end thereof associated with a chain and sprocket connection 98 with the shaft 54 and a sprocket and chain connection 99 is provided between the shafts 54 and 65. A seat 100 is mounted between beams 6 and 7 by cross members 101 and 102 and has pivoted thereon a lever 103 having a link connection 104 with the bell-crank lever 90 and a link connection 105 is provided between the bell-crank 90 and a lever 106 pivoted on a bracket 107 projecting from the rear cross member 108 of the transverse frame structure and operatively associated with the clutch C' which is similar to clutch C heretofore described in detail so that both of these clutches C and C' are operable in unison by the operator on the seat 100 for placing the four conveyor structures in operation at one time from the rear wheels 79 as will now be apparent.

It is thought that the construction, operation, utility, and advantages of this apparatus will now be quite apparent to those skilled in this art without a more detailed description thereof. It will be seen that the device is both efficient and reliable and will load without injuring the crop and will shield the crop from the wind because of the side plates described. The structure is easy to handle by a single operator and the parts are so constructed and arranged so as to be accessible in view of their compactness and convenience.

It is to be understood that the present embodiment of the invention has been disclosed in detail merely by way of example since in actual practice it has attained the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:—

1. In an apparatus of the class described, a wheel supporting structure including a longitudinal frame and a rear transverse frame, a gathering mechanism mounted at the front of the longitudinal frame, and comprising an endless structure, means training the endless structure in an elongated orbit, the longitudinal dimension of which is inclined upwardly and rearwardly of the apparatus, a plurality of spikes projecting outwardly from the endless structure, an endless longitudinally extending conveyor mounted on the longitudinal frame and having one end pivotally engaged with the rear end of the gathering mechanism, a primary transverse endless conveyor on the transverse train below the upper end of the longitudinal endless conveyor, and a second transverse endless conveyor rising from below one end of the primary conveyor on the transverse frame and inclining upwardly therefrom, means for operating the conveyors from the wheels of the supporting structure, and means for elevating the front end of the gathering mechanism, and said wheel supporting structures being of a width greater than the width of the longitudinal conveyor, and draft attaching means connected to the front end of the supporting structure alongside of the gathering mechanism.

2. In an apparatus of the class described, a supporting structure including a longitudinal frame and a rear transverse frame, an endless conveyor mounted on the longitudinal frame and extending for its full length thereof, a gathering mechanism pivotally engaged with one end of the elevator, said endless structure being disposed upon the frame in an inclined plane to extend upwardly from the rear of the gathering mechanism, a primary transverse endless conveyor on the transverse frame below the upper end of the longitudinal endless conveyor, and a second transverse endless conveyor rising from below one end of the primary conveyor on the transverse frame and inclining upwardly therefrom, wheel supporting means for the longitudinal frame, said supporting means projecting laterally from the longitudinal endless conveyor, and draft attaching means connected to the front end of the extension alongside of the gathering mechanism, standards rising from intermediate portions of the longitudinal conveyor, sheaves rotatably mounted on the upper ends of the standards, cables trained over said sheaves and attached to the forward end of the gathering mechanism, and means for pulling the cable so that the forward end of the said gathering mechanism may be raised.

In testimony whereof I affix my signature.

HERRMANN STRODTHOFF.